(12) United States Patent
Ribet et al.

(10) Patent No.: US 8,197,685 B2
(45) Date of Patent: Jun. 12, 2012

(54) FILTER ELEMENT, SECURING RING AND METHOD FOR FILTERING

(75) Inventors: Jean Luis Ribet, Haisnes (FR); Sandrine Minebois, Haisnes (FR)

(73) Assignee: Sefar AG (CH)

( * ) Notice: Subject to any disclaimer, the term of this patent is extended or adjusted under 35 U.S.C. 154(b) by 371 days.

(21) Appl. No.: 12/538,667

(22) Filed: Aug. 10, 2009

(65) Prior Publication Data
US 2010/0200518 A1    Aug. 12, 2010

(30) Foreign Application Priority Data

Aug. 12, 2008    (EP) .................................... 08014380

(51) Int. Cl.
*B01D 25/176*   (2006.01)
(52) U.S. Cl. ......... 210/230; 277/634; 277/637; 277/918
(58) Field of Classification Search ........................ None
See application file for complete search history.

(56) References Cited

U.S. PATENT DOCUMENTS

| | | | | | |
|---|---|---|---|---|---|
| 772,132 | A | * | 10/1904 | Crossley ....................... | 210/231 |
| 1,316,465 | A | * | 9/1919 | Stone ............................ | 210/227 |
| 1,801,933 | A | * | 4/1931 | Ouss ............................. | 210/231 |
| 2,383,868 | A | * | 8/1945 | Kraus ............................ | 210/228 |
| 3,543,938 | A | * | 12/1970 | Busse et al. ..................... | 210/229 |
| 4,053,416 | A | * | 10/1977 | Howard et al. ................. | 210/227 |
| 4,217,224 | A | * | 8/1980 | Fismer et al. .................. | 210/231 |
| 4,237,009 | A | * | 12/1980 | Kurita ........................... | 210/227 |
| 4,379,051 | A | * | 4/1983 | Hiesinger et al. ............. | 210/193 |
| 4,491,519 | A | * | 1/1985 | Kurita ........................... | 210/225 |
| 4,765,859 | A | * | 8/1988 | Heath et al. ................. | 156/272.4 |
| 4,931,178 | A | * | 6/1990 | Manniso et al. ............... | 210/228 |
| 4,954,378 | A | * | 9/1990 | Goodman ....................... | 428/63 |
| 5,011,601 | A | * | 4/1991 | Busse ........................... | 210/229 |

(Continued)

FOREIGN PATENT DOCUMENTS

DE    9312880 U1    10/1993

(Continued)

OTHER PUBLICATIONS

European Search Report; EP08014380; Jan. 15, 2009.

*Primary Examiner* — Robert James Popovics
(74) *Attorney, Agent, or Firm* — Studebaker & Brackett PC; Donald R. Studebaker

(57) ABSTRACT

The invention relates to a filter element for a press filter comprising first and second filtering means, each having at least one opening for the passage of a slurry to be filtered, and first and second connecting means for connecting the openings of the first and second filtering means. Each of the first and second connecting means comprises a flange portion and a tubular portion, wherein the flange portion of the first connecting means is fixedly attached to the first filtering means and the flange portion of the second connecting means is fixedly attached to the second filtering means, and wherein the tubular portion of the first connecting means is insertable into the tubular portion of the second connecting means. A securing ring is provided, which is insertable into the tubular portion of the first connecting means and is adapted to exert a radial force on the tubular portion of the first connecting means, pressing the tubular portion of the first connecting means against the tubular portion of the second connecting means.

8 Claims, 5 Drawing Sheets

U.S. PATENT DOCUMENTS

| | | | | |
|---|---|---|---|---|
| 5,958,173 A * | 9/1999 | Hibble | ............... | 156/272.4 |
| 6,007,717 A * | 12/1999 | Hayhurst et al. | ............... | 210/230 |
| 6,149,806 A * | 11/2000 | Baer | ............... | 210/231 |
| 6,852,220 B1 * | 2/2005 | Grafen et al. | ............... | 210/229 |
| 6,932,906 B2 * | 8/2005 | Lydon et al. | ............... | 210/230 |
| 6,971,526 B2 * | 12/2005 | Hibble | ............... | 210/499 |
| 7,001,322 B2 * | 2/2006 | Jorgensen et al. | ............... | 494/26 |
| 7,635,132 B2 * | 12/2009 | Hibble | ............... | 277/634 |
| 2002/0107131 A1 * | 8/2002 | Jorgensen et al. | ............... | 494/37 |
| 2002/0153105 A1 * | 10/2002 | Lydon et al. | ............... | 156/556 |
| 2004/0112818 A1 * | 6/2004 | Hibble | ............... | 210/230 |
| 2006/0131224 A1 * | 6/2006 | Hibble | ............... | 210/224 |
| 2010/0032383 A1 * | 2/2010 | Gaiser et al. | ............... | 210/767 |
| 2010/0200518 A1 * | 8/2010 | Ribet et al. | ............... | 210/767 |

FOREIGN PATENT DOCUMENTS

| | | |
|---|---|---|
| DE | 42 27 670 A1 | 2/1994 |
| DE | 10156199 C1 | 11/2002 |
| EP | 0640786 A2 | 3/1995 |
| EP | 1925351 A | 5/2008 |
| JP | 05099491 A | 4/1993 |
| WO | 9507743 A | 3/1995 |

* cited by examiner

FILTER ELEMENT, SECURING RING AND METHOD FOR FILTERING

The present invention relates to a filter element for a press filter comprising first and second filtering means, each having at least one opening for the passage of a slurry to be filtered, and first and second connecting means for connecting the openings of the first and second filtering means, each of the first and second connecting means comprising a flange portion and a tubular portion, wherein the flange portion of the first connecting means is fixedly attached to the first filtering means and the flange portion of the second connecting means is fixedly attached to the second filtering means, and wherein the tubular portion of the first connecting means is insertable into the tubular portion of the second connecting means, according to the preamble of claim 1.

The invention further relates to a securing ring to be inserted into a filter element, according to the preamble of claim 10.

In a third aspect the invention relates to a method for filtering a slurry by means of a press filter having at least one filter plate with a feed port, according to the preamble of claim 11.

A filter press is a well-known and efficient apparatus for separating solids and liquids. Filter presses generally comprise a plurality of filter plates, which are stacked and clamped together on their peripheries, thereby forming filter chambers between the stacked filter plates. Each filter plate includes a feed port for a slurry to be filtered, which is formed as a through hole connecting two adjacent filter chambers. The term "slurry", as used herein, refers to a mixture of liquid and solids that is introduced to a filter press for separation.

Both sides of the filter plates are covered with filtering means, e.g. a filtering cloth or membrane. The filtering means are provided with a feed hole corresponding to the feed port of the filter plate. For an effective operation of the press filter it is important that the filtering means are interconnected in a leak-proof manner in the region of the feed port, so as to prevent the slurry from escaping between the filter plate and the filtering means in the region of the feed port.

When operating the filter press, the slurry to be filtered enters the filter press via an inlet port provided at one side of the filter press and is distributed to the filter chambers via the feed ports in the filter plates. The liquid is filtered by passing through the filtering means, forming a filter cake in the filter chambers. The filtered liquid (filtrate) leaves the press filter via filtrate ports in the filter plates.

EP 1 925 351 A1, which forms the basis for the preamble of claim 1, discloses a connecting device for connecting two filtering means of a press filter. The connecting device comprises two flange elements, which can be connected to each other by an axial insertion of one flange element into the other and a subsequent relative turning.

Another method of interconnecting filtering means of a press filter is known from DE 101 56 199 C1. A sleeve comprising a flange portion at one side and an annular groove at another side is introduced into an opening formed by two flange rings. A locking ring is inserted into the annular groove for axially locking the two flange rings.

U.S. Pat. No. 6,971,526 B2 discloses a method for fixedly joining a filter cloth to a filter plate using a flanged cloth connector ring. The flanged cloth connector ring is attached to the filter cloth around a feed port of the cloth and inserted into a receiving channel in the filter plate. A locking ring or a distribution ring may be inserted into the channel adjacent to the connector ring to retain the connector ring in place.

The object of the invention is to provide a filter element for a press filter and a method for filtering a slurry, which permit an easy assembly and a reliable connection of two filtering means.

The object is in a first aspect of the invention achieved by a filter element for a press filter according to claim 1. The object is further achieved by a securing ring according to claim 10 and a method for filtering a slurry according to claim 11. Preferred embodiments of the invention are described in the dependent claims and the following description together with the accompanying drawings.

According to the invention, the filter element is characterized in that a securing ring is provided, which is insertable into the tubular portion of the first connecting means and is adapted to exert a radial force on the tubular portion of the first connecting means, pressing the tubular portion of the first connecting means against the tubular portion of the second connecting means.

One basic idea of the invention is to achieve a reliable and leak-proof connection of two connecting means by radially pressing one connecting means against the other. The radial pressing enhances the tightness of the connection and seals the two connecting means.

An important aspect of the invention is to provide a separate element—namely the securing ring—in addition to the first and second connecting means in order to tightly couple the connecting means. The provision of a separate element allows for a quick and easy assembly of the filter element. In a first step, the tubular portion of the first connecting means is introduced into the tubular portion of the second connecting means. This step can be easily accomplished without an excessively tight fit, i.e. high friction, between the two connecting means. In a second step, the securing ring is inserted into the tubular portion of the first connecting means, pressing the tubular portion of the first connecting means against the tubular portion of the second connecting means. With the securing ring, the friction between the two elements is increased, achieving a friction fit and/or a sealed connection between the first and second connecting means.

In order for the pressure exerted by the securing ring to be transferred via the first connecting means to the second connecting means, it is preferred by the invention that at least one of the first and second connecting means comprises a resilient material, particularly a rubber material. The resilient material can also be a thermoplastic elastomer. In this regard, it is particularly preferred that the first connecting means is made up of a resilient material. In other words, the first connecting means should be adapted to allow for an at least slight increase of the diameter of its for example tubular portion.

Another preferred embodiment of the invention is characterized in that the tubular portions of the first and second connecting means comprise corresponding engagement means provided on an outer surface of the tubular portion of the first connecting means and an inner surface of the tubular portion of the second connecting means, respectively. These additional engagement means enhance the tightness of the connection by providing a form-locking or snap connection in addition to the frictional connection. Moreover, the engagement means can assist an operator in identifying a desired relative position of the two connecting means by providing a tactile feedback once the desired position is reached. The engagement means preferably include at least one protrusion and one recess, in particular a circular protrusion and a corresponding circular recess. The protrusion and the recess could also comprise another cross-sectional shape like a square or rectangle etc.

According to another preferred embodiment, the first connecting means comprises a ring-shaped receiving portion provided at an inner surface of its tubular portion for receiving the securing ring. The receiving portion is preferably constructed as a circular groove having a width substantially equal to a width of the securing ring. The receiving portion allows for a defined placement of the securing ring in the tubular portion of the first connecting means. Moreover, the receiving portion securely retains the securing ring in place.

In order to provide the radial force, it is preferred that the securing ring has a relaxed state, in which an outer diameter is larger than an inner diameter of the tubular portion of the first connecting means, and a tensioned state, in which the diameter of the securing ring is smaller than the inner diameter of the tubular portion of the first connecting means. In other words, when no force is applied to the securing ring, the securing ring has an outer diameter, which is larger than an inner diameter of the tubular portion of the first connecting means. The securing ring is adapted to be tensioned in a way that its diameter is reduced. In this tensioned state, the securing ring tends to expand, thereby exerting a force, which is directed radially outward.

A preferred embodiment of the securing ring is given by a securing ring comprising an opening, thereby forming an open ring with two end portions adjacent to the opening. The open ring permits to contract the ring, thereby reducing its diameter.

In connection with the open ring it is particularly preferred that the end portions of the securing ring are formed in a stepped manner. The stepped end portions are preferably equally formed, such that the highest step of one end portion is flush with the lowest step of the other end portion and vice versa. This embodiment allow for a smaller opening of the ring in a transverse direction, while at the same time maintaining the degree of possible contraction of the ring.

A particularly preferred embodiment of the securing ring is characterized in that the stepped end portions of the securing ring are formed by first and second lips, respectively, integrally formed with the securing ring, wherein the first lip has a parallel offset with regard to the second lip. Preferably, the lips are equally sized and each lip takes up approximately half of the overall width of the securing ring. The provision of two lips provides the advantage that the surface for exerting the radial force is increased.

Another preferred embodiment of the filter element is characterized in that in a relaxed and a tensioned state of the securing ring, the lips overlap in a transverse direction of the securing ring. This embodiment is particularly advantageous, as—although the ring is formed as an open ring—it can exert a radial force over its entire circumference. In other words the securing ring is capable of exerting a pressure substantially equally distributed over a circumferential surface.

In a second aspect, the above-mentioned object of the invention is solved by a securing ring according to claim 10. The securing ring is to be inserted into a filter element of a press filter and comprises a ring body having a relaxed state with a predetermined diameter and a tensioned state, in which the diameter is reduced. With this securing ring, the connecting means can be quickly and easily connected.

In yet another aspect of the invention, the object is solved by a method for filtering a slurry by means of a press filter according to claim 11. The method is characterized in that a filter element is arranged on a filter plate and first and second connecting means are inserted into a feed port of a filter plate and connected therein by means of a securing ring. Subsequently the slurry is filtered, wherein a filter cake is built up on the filtering means. When the filter cake has reached a predetermined thickness, the filter is opened and the filter cake is removed. If necessary, the filter elements are cleaned and/or replaced. The filter is then closed again and the filtering process is repeated.

The filter element according to the invention will now be further described with reference to the accompanying drawings, in which.

Figure 1:
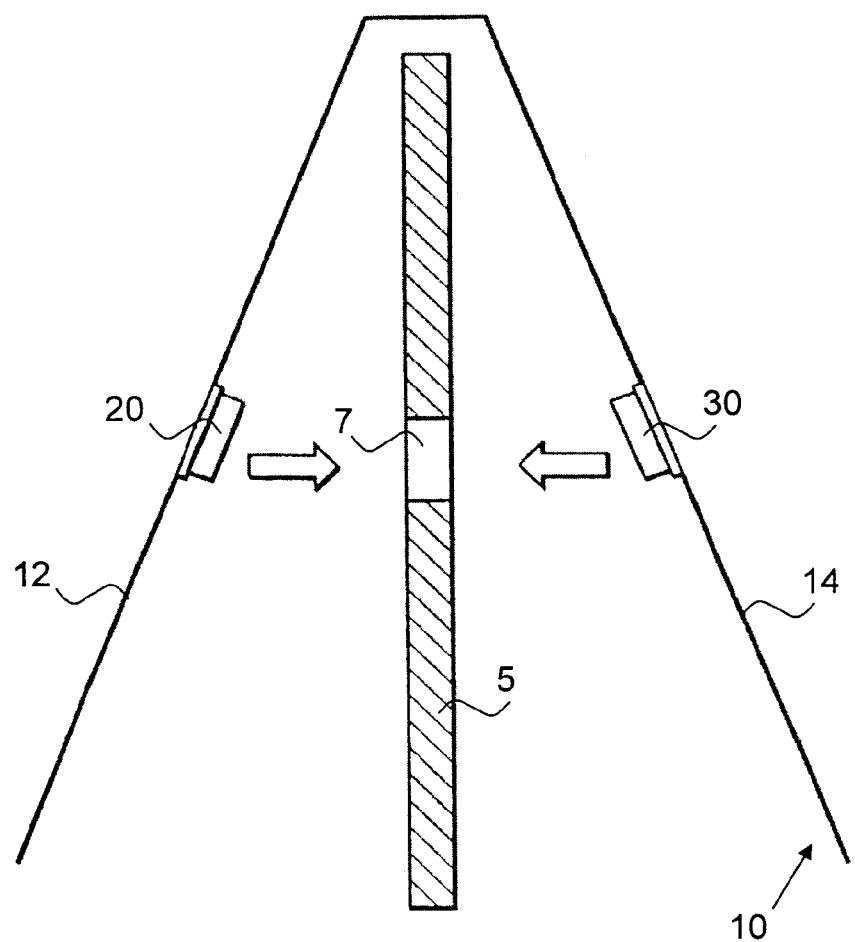
FIG. 1 shows the mounting of a filter element to a filter plate.

Referring to the drawings, FIG. 1 illustrates a general set-up of a filter element 10 comprising first and second connecting means 20, 30 and first and second filtering means 12, 14. The filter element 10 is mounted on a filter plate 5 by inserting the connecting means 20, 30 into a feed port 7, formed as a through hole. In this embodiment the feed port 7 is centrally arranged on the filter plate 5. After inserting the connecting means 20, 30 into the feed port 7, the connecting means 20, 30 are interconnected, as will be described later. As can be gathered from FIG. 1, the filtering means 12, 14 are formed by a one-piece filter cloth, e.g. a textile. The filter cloth is wrapped around the filter plate 5.

Figure 2:
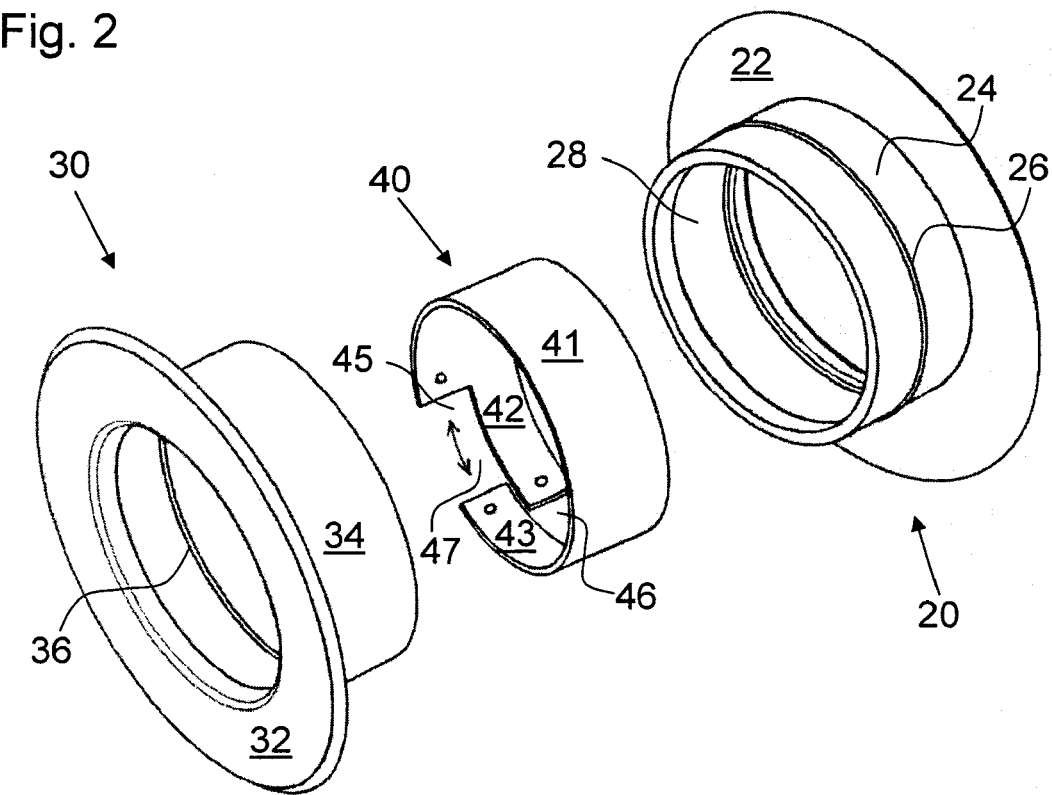
FIG. 2 shows a first and second connecting means and a securing ring in a disassembled state.

FIG. 2 shows an embodiment of a first connecting means 20, a second connecting means 30 and a securing ring 40 in a disassembled state. The first connecting means 20 comprises a flange portion 22 and a tubular portion 24. The second connecting means 30 comprises a flange portion 32 and a tubular portion 34. The tubular portion 24 of the first connecting means 20 is adapted to fit into the tubular portion 34 of the second connecting means 30. An annular protrusion 26 is provided on an outer circumference of the tubular portion 24 of the first connecting means 20, corresponding to an annular groove 36 arranged on an inner surface of the tubular portion 34 of the second connecting means 30.

The filtering means 12, 14, not shown in the embodiment of FIG. 2, are firmly connected to the flange portions 22, 32 of the connecting means 20, 30. Possible methods for the fixation of the filtering means 12, 14 to the flange portions 22, 32 include gluing, welding, sewing or other bonding techniques.

Figure 3:
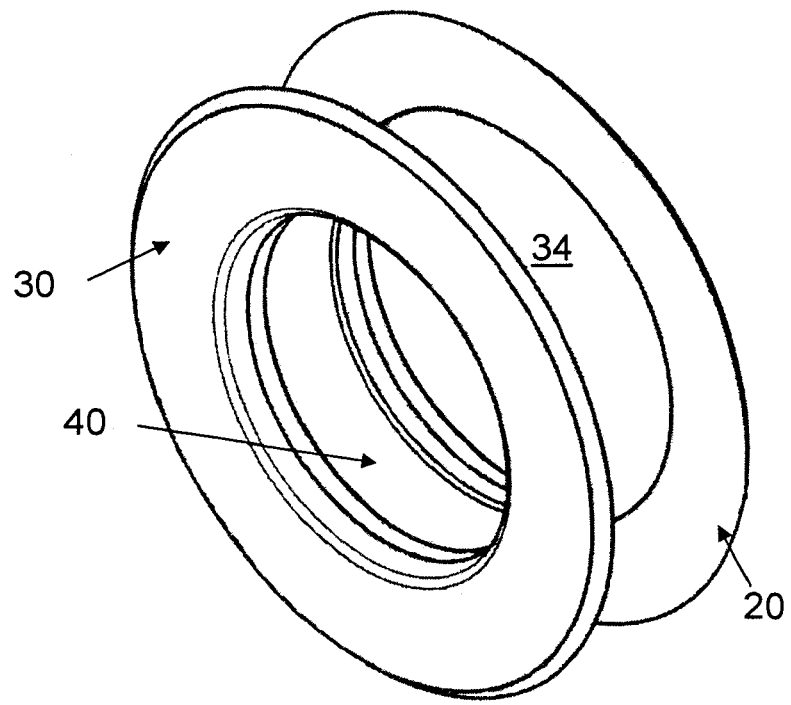
FIG. 3 shows the connecting means and securing ring of FIG. 1 in an assembled state.

FIG. 3 shows the connecting means 20, 30 and the securing ring 40 in an assembled state. The securing ring 40 is received in a receiving portion 28 provided at an inner surface of the tubular portion 24 of the first connecting means 20 (see FIG. 1).

Figure 4:
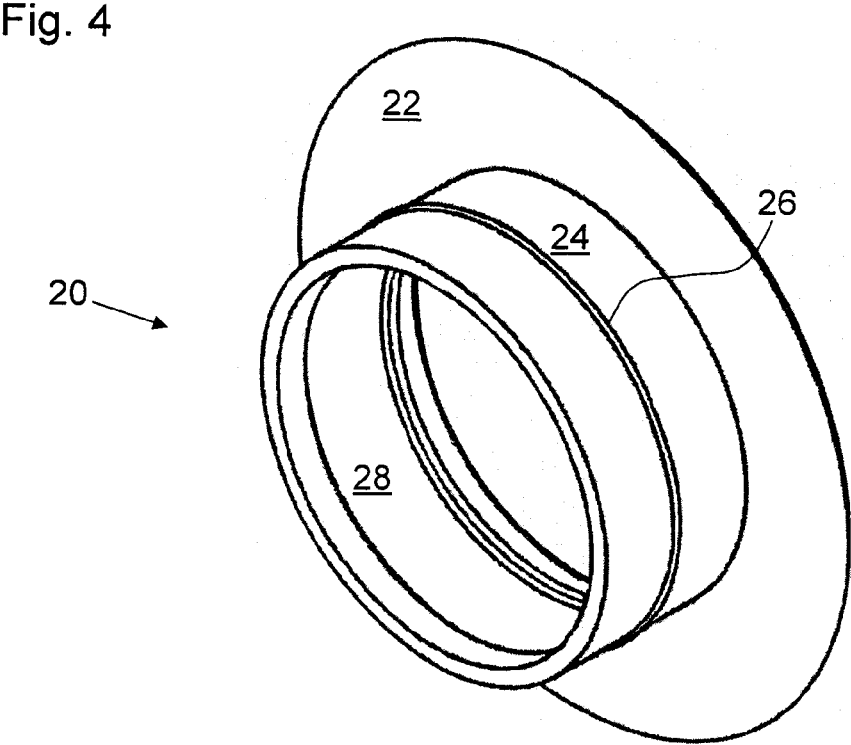
FIG. 4 shows a perspective view of a first connecting means.
Figure 5:
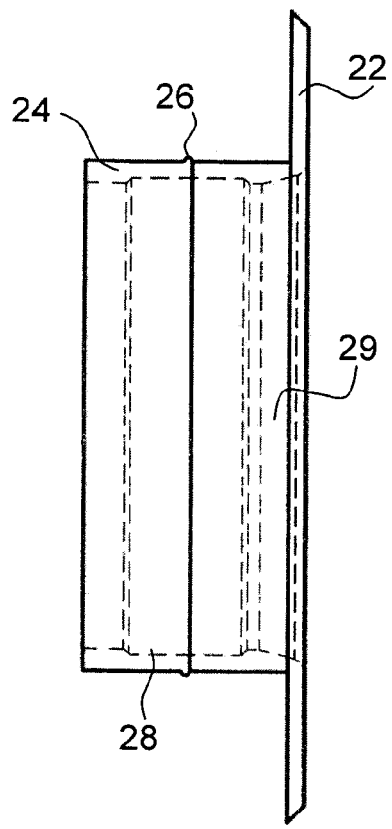
FIG. 5 shows a side view of the first connecting means of FIG. 4.

FIGS. 4 and 5 show an embodiment of the first connecting means 20. FIG. 4 shows a perspective view of the first connecting means 20. FIG. 5 shows a side view of the first connecting means 20, wherein the inner circumferential surface is shown in dashed lines. As can be seen, the receiving portion 28 is formed as an annular groove arranged substantially centrally in the tubular portion 24. The width of the groove corresponds to the width of the securing ring 40. For an easier installation of the securing ring 40 in the first connecting means 20 the connecting means 20 comprises a chamfered area 29 in the region of the flange portion 22. In this chamfered area 29 the inner diameter of the connecting means 20 increases towards the flange portion 22, from where the securing ring 40 is to be installed.

Figure 6:
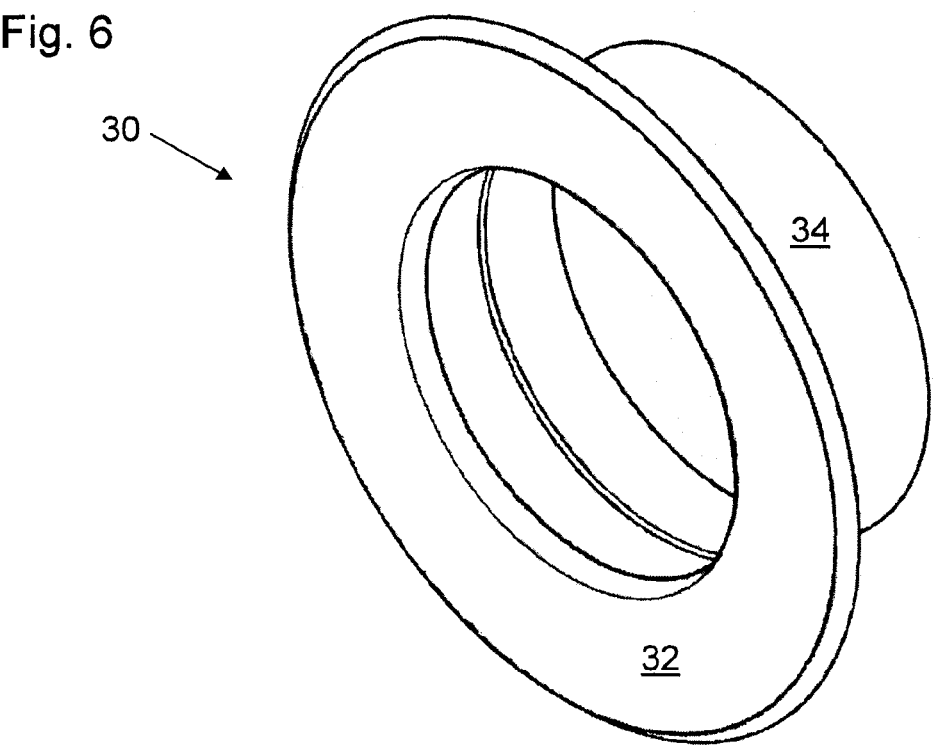
FIG. 6 shows a perspective view of the second connecting means.
Figure 7:
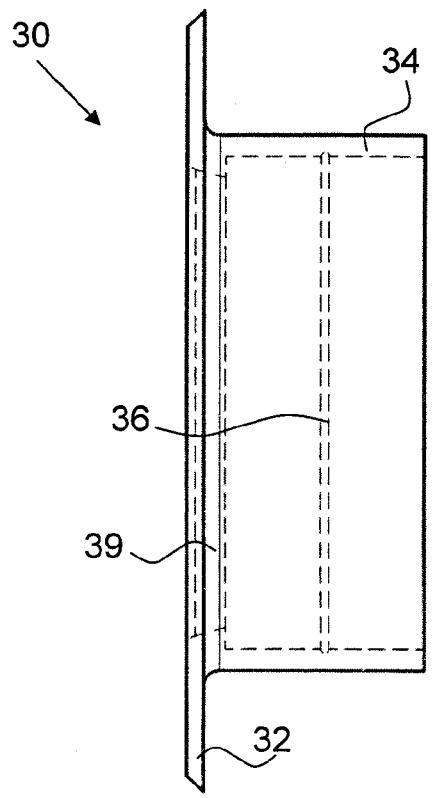
FIG. 7 shows a side view of the second connecting means of FIG. 6.

FIGS. 6 and 7 show the second connecting means 30. FIG. 6 shows a perspective view of the second connecting means 30. FIG. 7 shows a side view of the second connecting means 30, wherein the inner circumferential surface is shown in dashed lines. An annular groove 36 corresponding to the annular protrusion 26 is formed on an inner surface of the tubular portion 34. As the first connecting means 20, the second connecting means 30 comprises a chamfered area 39 in the region of the flange portion 32. The provision of two chamfered areas 29, 39 allows for an installation of the securing ring 40 alternatively from the side of the first connecting means 20 or the second connecting means 30.

Figure 8:
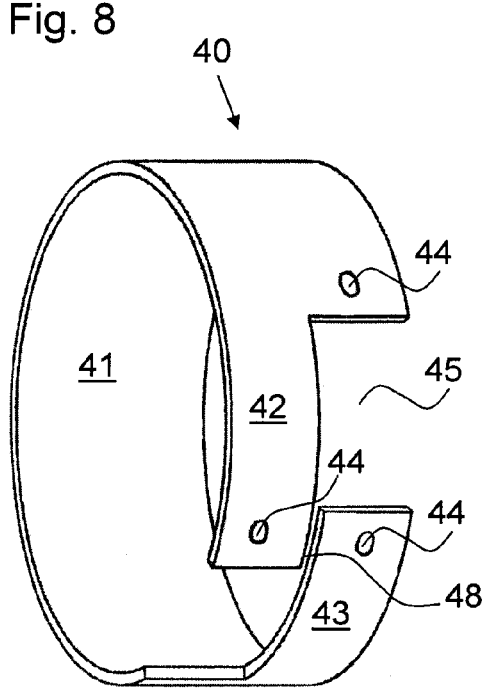
FIG. 8 shows a perspective view of a securing ring in a relaxed state.
Figure 9:
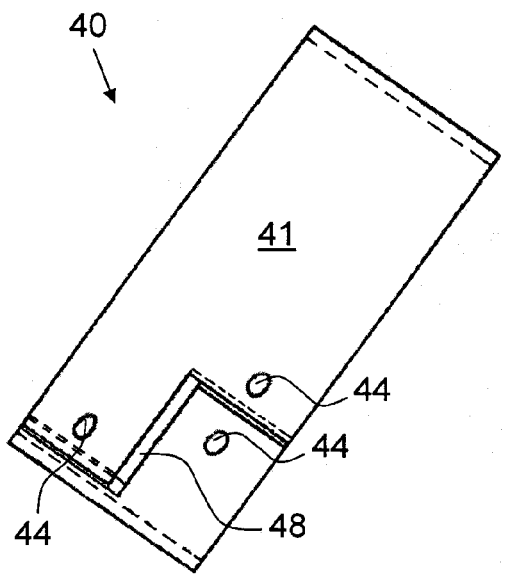
FIG. 9 shows a perspective view of the securing ring of FIG. 8 in a tensioned state.
Figure 10:
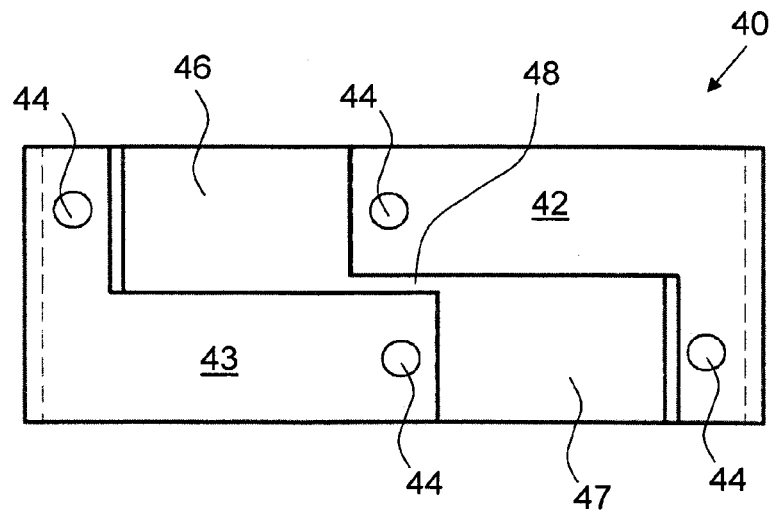
FIG. 10 shows a side view of the securing ring of FIG. 8 in a relaxed state.

FIGS. 8 to 10 show details of an embodiment of the securing ring 40. In FIG. 8 the securing ring is shown in an un-tensioned state. The securing ring 40 is formed as an open ring with an opening 45. The opening 45 is formed in the shape of a Z and comprises two substantially equally sized first and second opening portions 46, 47 and a narrow slit 48 (see FIG. 10). The first opening portion 46 is located on a first axial section of the securing ring 40, whereas the second opening portion 47 is located on a second axial section of the securing ring 40. Furthermore, first and second opening portions 46, 47 have an offset in a circumferential direction of the securing ring 40. The slit 48 extends in a circumferential direction of the ring 40 and interconnects the opening portions 46 and 47.

The securing ring 40 comprises a main portion 41 and two lips 42, 43, which are integrally formed with the main portion 41. The main portion 41 has a width corresponding to the width of the securing ring 40. The lips 42, 43 each have a width being smaller than the width of the securing ring 40. In the embodiment shown, the lips have a width amounting to approximately half of the width of the securing ring 40. Each lip 42, 43 is aligned with one of the opening portions 46, 47.

FIG. 9 shows the securing ring 40 in a tensioned state. The securing ring is tensioned by moving the lips 42, 43 into the opening portions 46, 47, thereby reducing the diameter of the securing ring 40. In a maximally tensioned state, as shown in FIG. 9, end portions of the lips 42, 43 abut on end portions of the main body 41. The diameter of the securing ring 40 in this maximally tensioned state is only slightly smaller than the inner diameter of the tubular portion 24 of the first connecting means 20.

FIG. 10 shows a side view of the securing ring 40. In the securing ring 40 are formed four holes 44, which can be engaged by an engagement device in order to convert the securing ring 40 from the un-tensioned state into the tensioned state. This engagement device can e.g. be a gripper or pliers. As can be seen, two pairs of holes a provided, each pair having one hole located on the main body 41 and a second hole on a lip 42, 43. The holes 44 are arranged such that the hole provided on the main portion 41 is aligned in a circumferential direction with the hole provided on the lip 42, 43.

If regarded in the transverse direction in a determined circumferential position of the securing ring 40, the opening 45 does not extend over the entire width of the ring 40, neither in the tensioned nor in the un-tensioned state. This very important feature results in a substantially equal radial force over the entire circumference of the securing ring 40, thereby enhancing the tightness of the fit between the first and the second connecting means 20, 30.

The invention claimed is:

1. A filter element for a press filter comprising:
   first and second filtering means, each said filtering means having at least one opening for the passage of a slurry to be filtered;
   first and second connecting means for connecting the openings of the first and second filtering means, each of said first and second connecting means comprising:
   a flange portion; and
   a tubular portion;
   wherein the flange portion of the first connecting means is fixedly attached to the first filtering means and the flange portion of the second connecting means is fixedly attached to the second filtering means, and wherein the tubular portion of the first connecting means is insertable into the tubular portion of the second connecting means; and
   a securing ring comprising:
   a ring-shaped main portion having a perimeter opening; and
   first and second lips formed in a stepped manner and integrally formed with said main portion, said first and second lips being adjacent to said perimeter opening, said first lip has a parallel offset with regard to the second lip;
   wherein said securing ring is insertable into the tubular portion of the first connecting means and is constructed to exert a radial force on the tubular portion of the first connecting means, pressing the tubular portion of the first connecting means against the tubular portion of the second connecting means.

2. A filter element according to claim 1, wherein at least one of the first and second connecting means comprises a resilient material.

3. A filter element according to claim 2, wherein said resilient material is rubber.

4. A filter element according to claim 1, wherein the tubular portions of the first and second connecting means comprise corresponding engagement means provided on an outer surface of the tubular portion of the first connecting means and an inner surface of the tubular portion of the second connecting means, respectively.

5. A filter element according to claim 1, wherein the securing ring has a relaxed state, in which an outer diameter is larger than an inner diameter of the tubular portion of the first connecting means, and a tensioned state, in which the diameter of the securing ring is smaller than the inner diameter of the tubular portion of the first connecting means.

6. A filter element according to claim 1, wherein in a relaxed and a tensioned state of the securing ring, the lips overlap in a transverse direction of the securing ring.

7. A filter element according to claim 1, wherein the securing ring comprises engagement means for engagement with an engagement device.

8. A filter element according to claim 7, wherein said engagement means comprises holes.

* * * * *